United States Patent [19]

Dessouky

[11] Patent Number: 5,215,416
[45] Date of Patent: Jun. 1, 1993

[54] PECK DRILLING TOOL

[75] Inventor: Ahmed El Dessouky, Pico Rivera, Calif.

[73] Assignee: The Deutsch Company, Santa Monica, Calif.

[21] Appl. No.: 791,084

[22] Filed: Nov. 12, 1991

[51] Int. Cl.⁵ .............................................. B23B 39/10
[52] U.S. Cl. ....................................... 408/17; 408/130
[58] Field of Search .......................... 408/17, 130, 702; 173/9, 19

[56] References Cited

U.S. PATENT DOCUMENTS

| | | | |
|---|---|---|---|
| 2,079,640 | 5/1937 | Vickers et al. | 408/17 |
| 4,453,868 | 6/1984 | Winslow | 408/17 |
| 5,062,745 | 11/1991 | Eckman | 408/15 |

*Primary Examiner*—Daniel W. Howell
*Attorney, Agent, or Firm*—Pretty, Schroeder, Brueggemann & Clark

[57] ABSTRACT

A drilling tool having a cutter for drilling a hole in a workpiece is disclosed. The tool has a special peck drilling mechanism that controls the advancement and retraction of a cutter such that the cutter is advanced into the workpiece a short distance and then withdrawn. The peck drilling mechanism enables this cycle of advancing and then withdrawing the cutter to be repeated until the cutter bore a hole in the workpiece to the desired depth. Cycling of the tool in this manner is controlled by a clutch assembly and a retract mechanism that are pneumatically connected to each other and to the feed piston such that the number of cycles of the tool and the total depth of penetration by the cutter into the workpiece can be controlled.

5 Claims, 7 Drawing Sheets

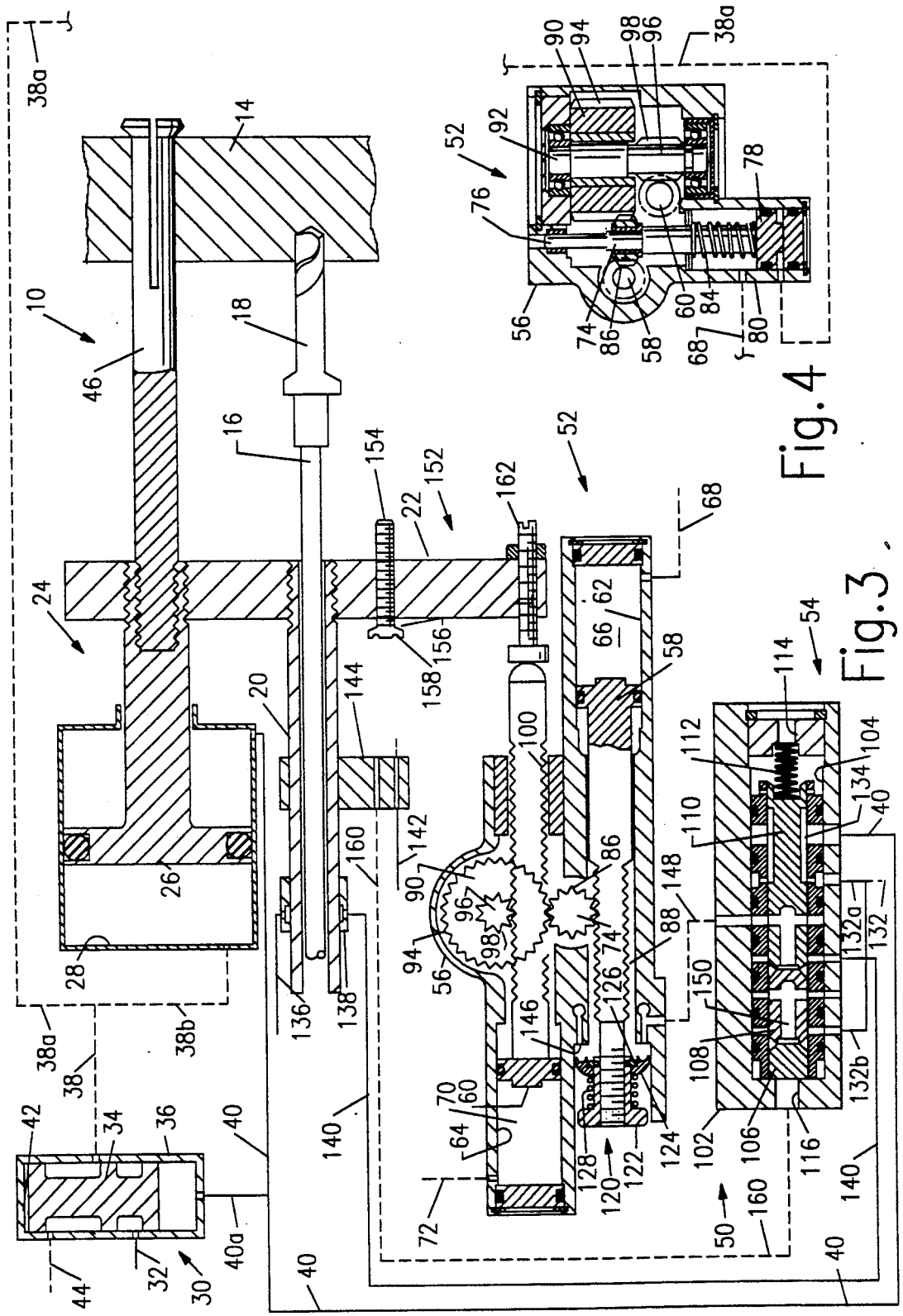

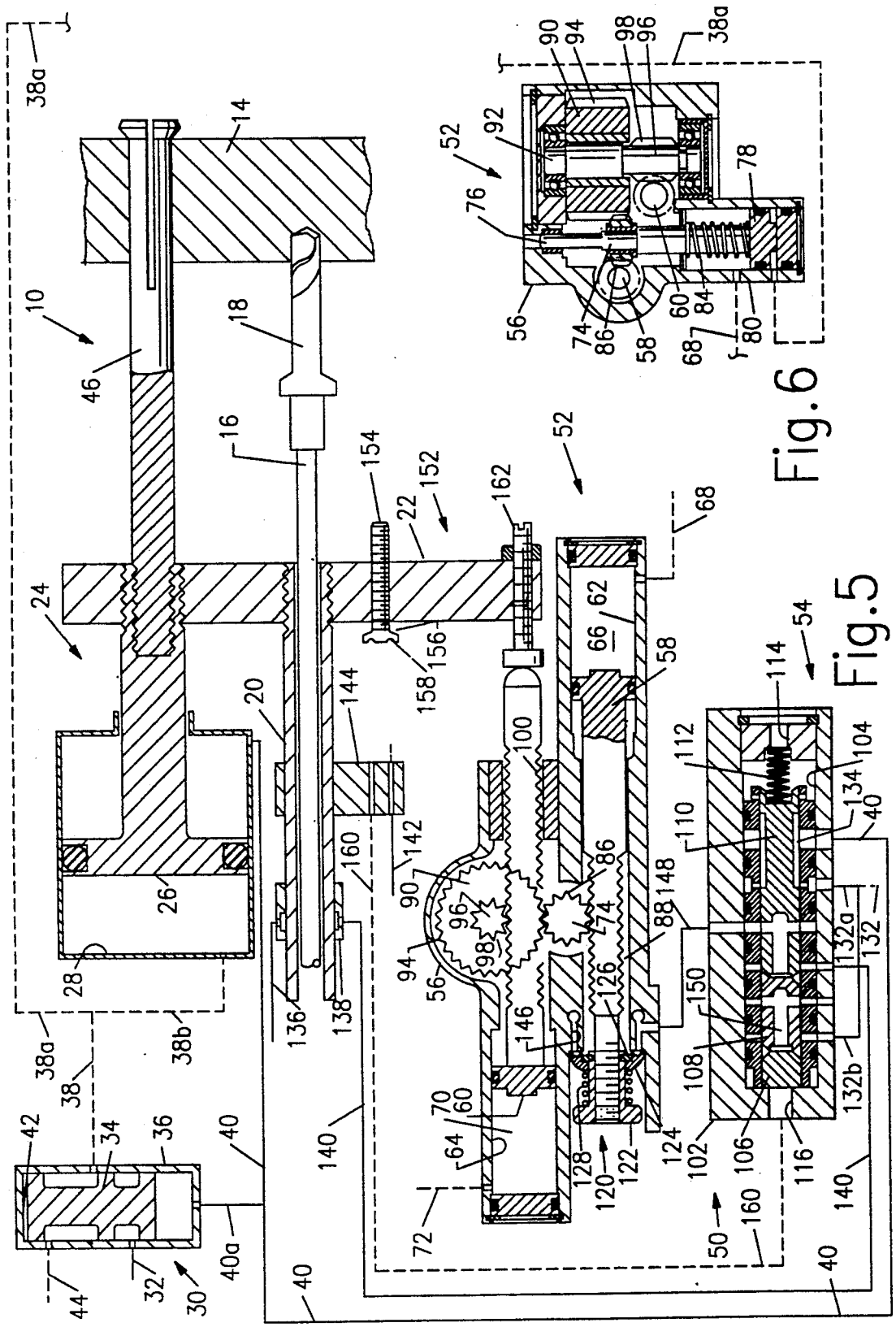

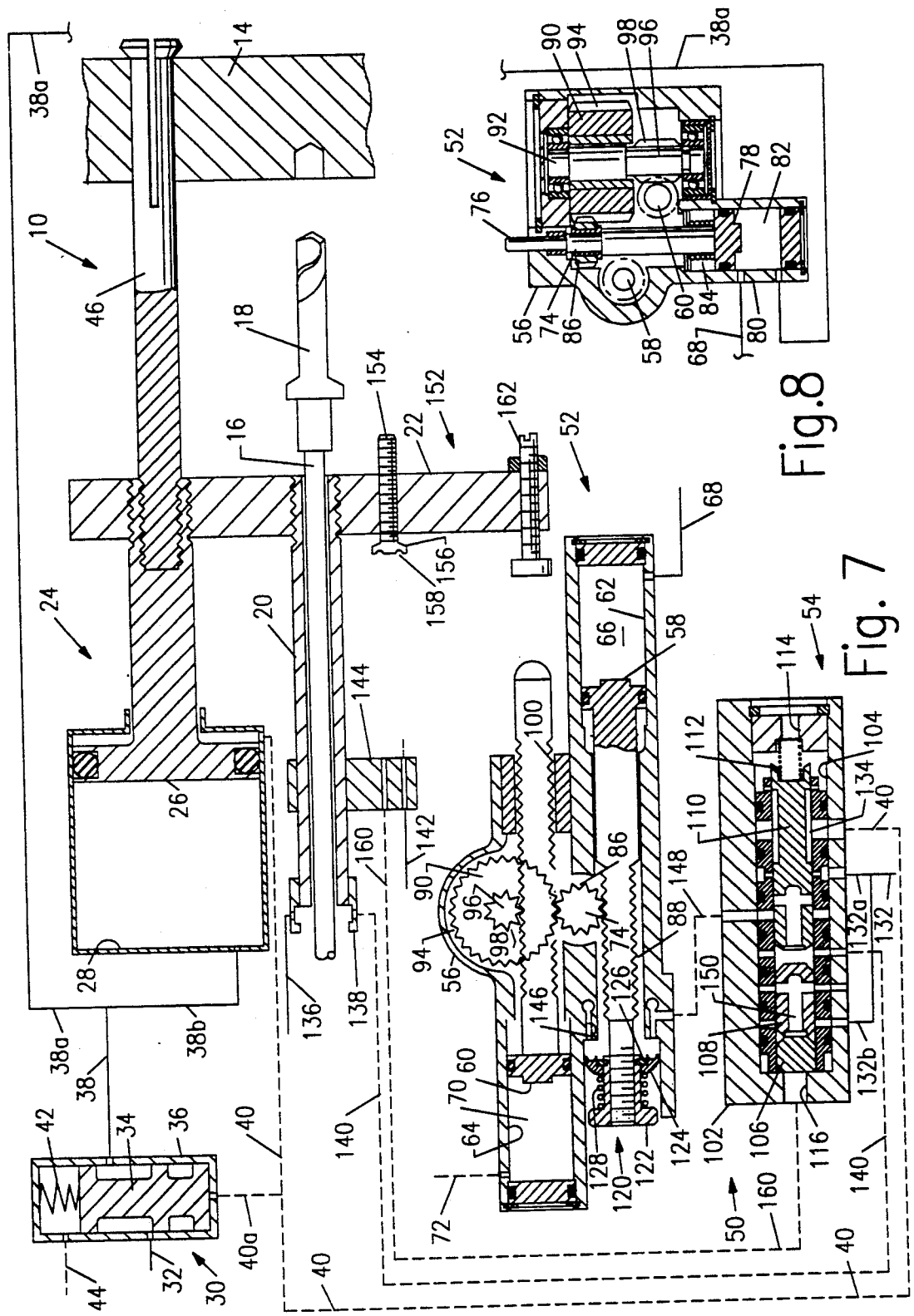

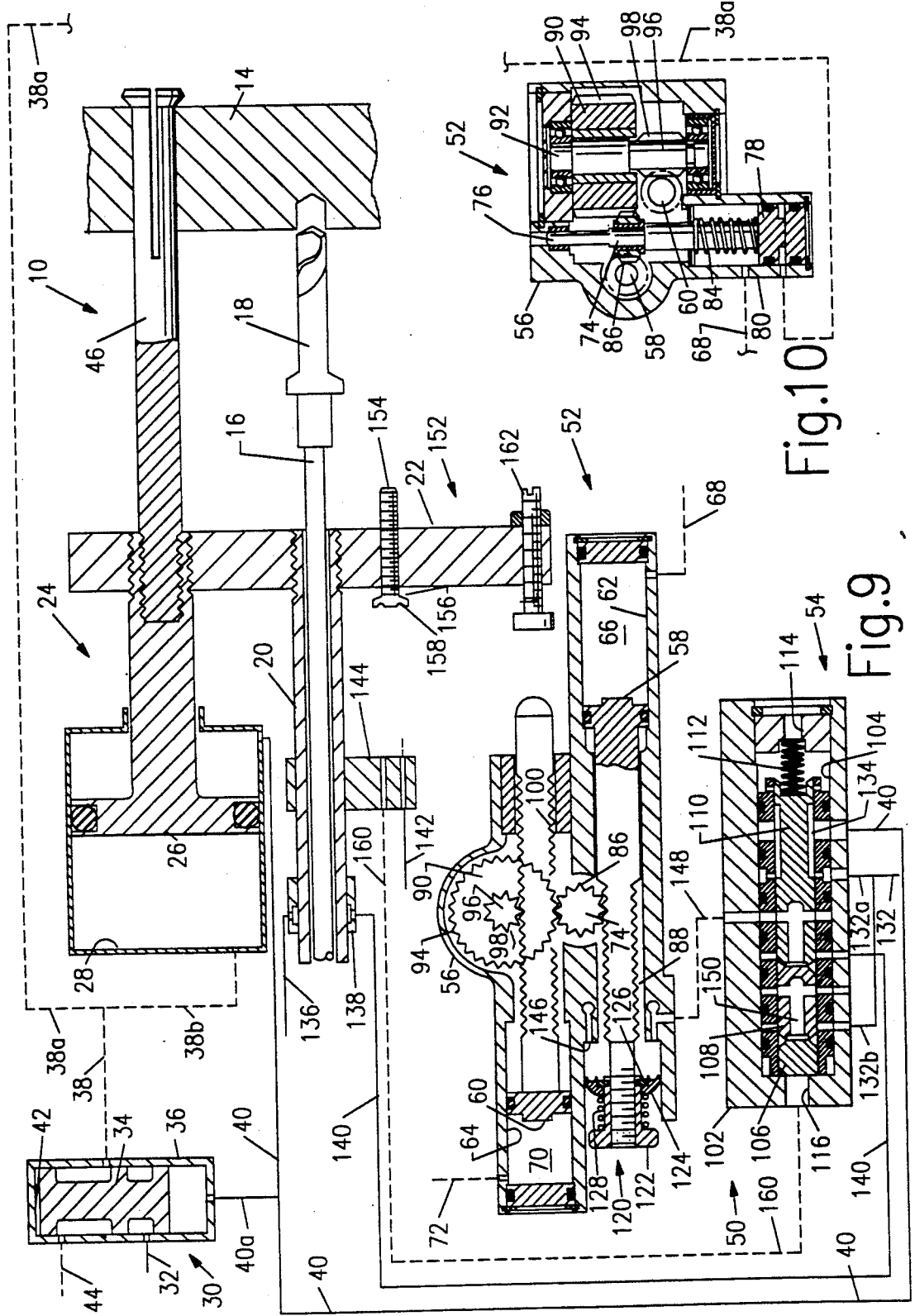

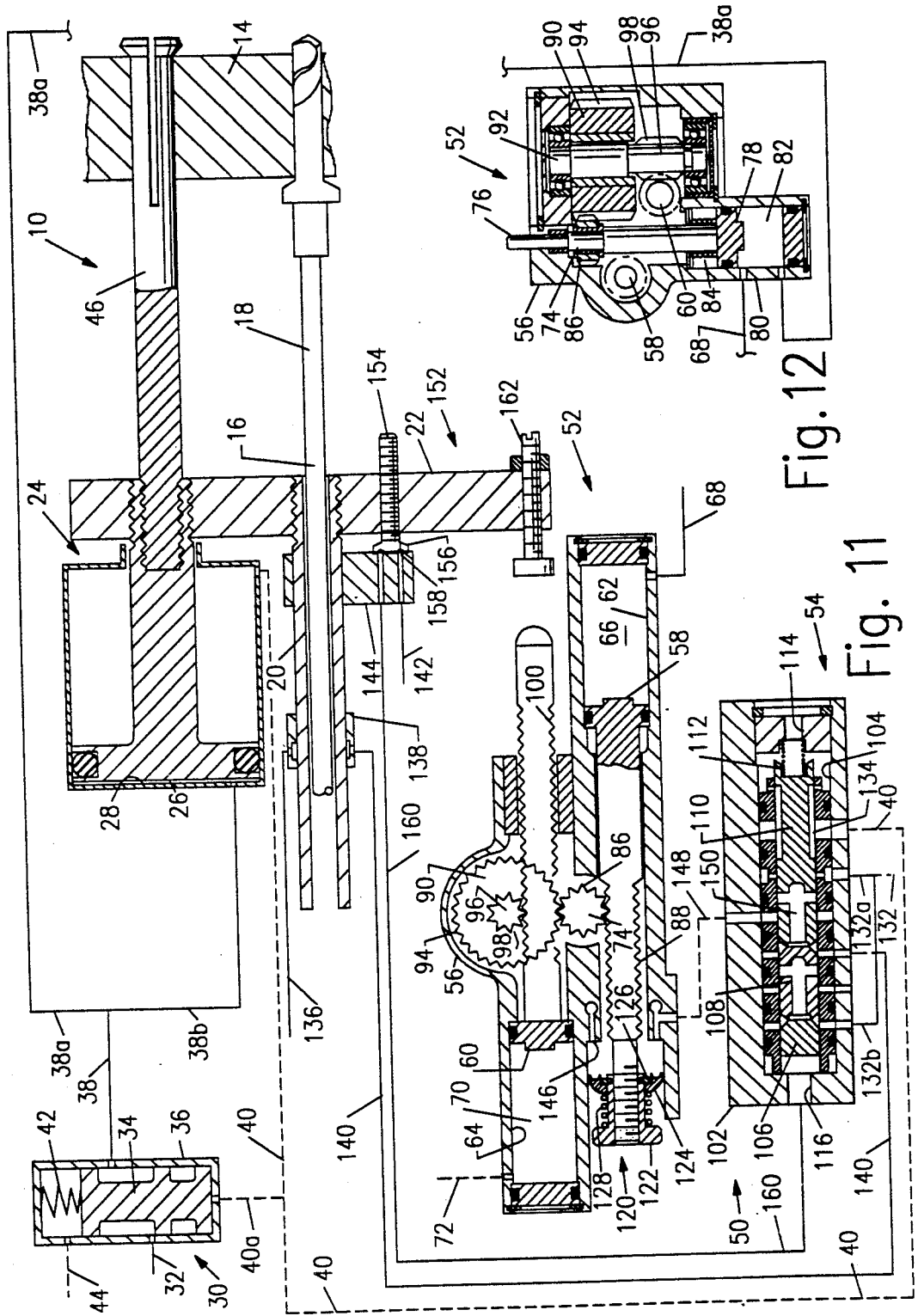

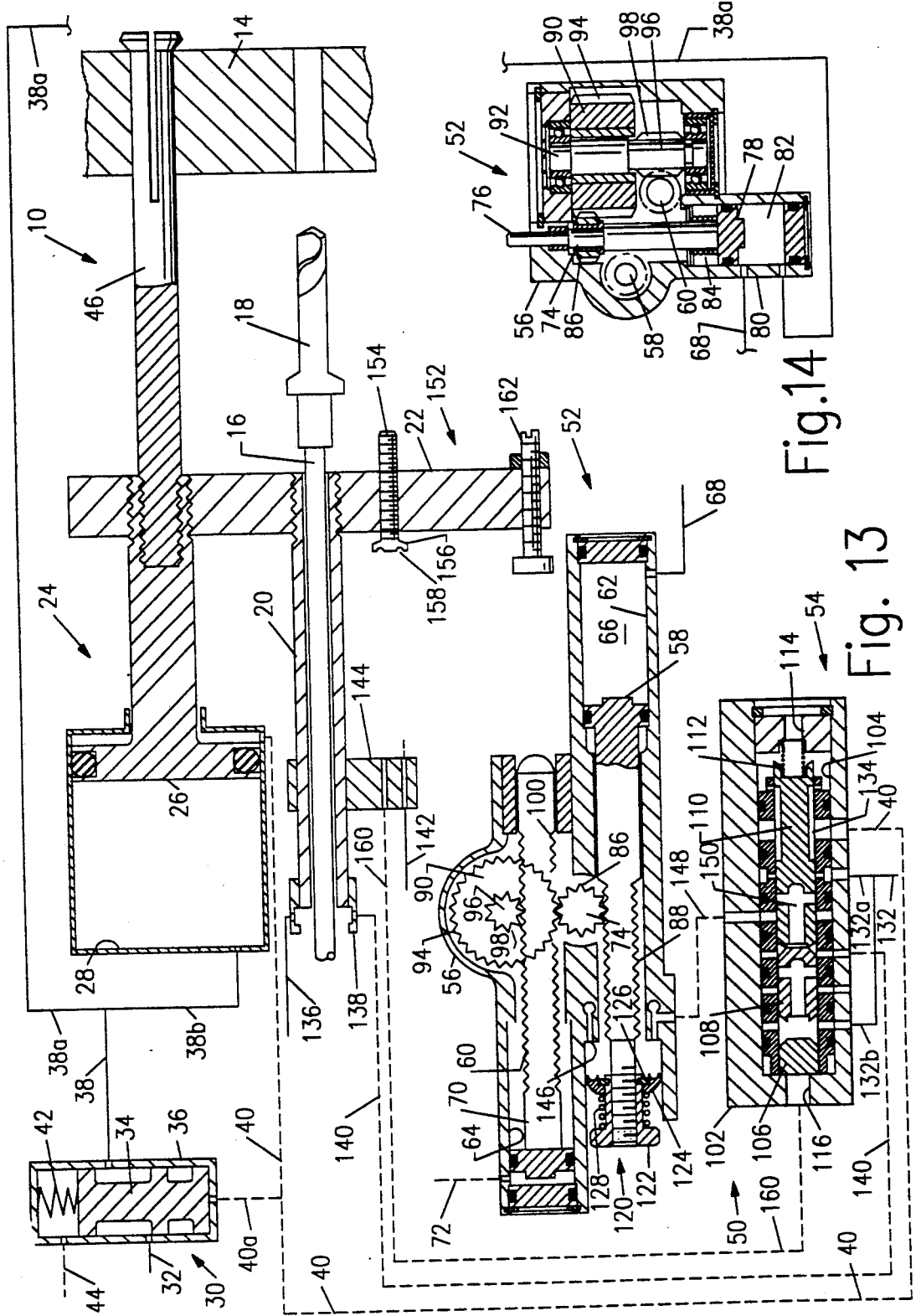

PECK DRILLING TOOL

BACKGROUND OF THE INVENTION

The present invention relates to power tools for drilling holes in a workpiece and, more particularly, to a peck drilling tool for gradually drilling such holes.

Over the years, many different types of drilling tools have been made for drilling holes in workpieces. The type of drilling tool selected for a particular job depends, of course, on several factors. In the aerospace industry, for example, highly specialized power drilling tools have been developed to rapidly and accurately drill holes in panels and other airframe structures to facilitate assembly of the aircraft. In these applications, various types of materials comprising the panels are encountered. These materials often are constructed from lightweight alloys in view of the need to have the aircraft weigh as little as possible after it has been assembled When it is necessary to drill holes in lightweight materials, such as aluminum or various types of composites, special care must be taken to ensure that the hole is carefully and properly drilled. It has been discovered, for example, that the use of a conventional drilling tool to bore directly through the material in one pass does not produce an accurate or consistent sized hole in many instances. These problems result primarily from the relatively large amounts of heat and high frictional forces that are developed during a single pass of the drill bit through the material, especially when thicker materials are involved.

Various solutions have been implemented to overcome the problems associated with the continuous single pass drilling tools noted above. One solution has been the development of the so-called peck drilling tool. The peck drilling tool is usually a pneumatically or hydraulically operated power tool in which the drill bit is advanced into the material a short distance and then withdrawn. This cycle of advancing and then withdrawing the drill bit is repeated until the drill bit eventually bores a hole completely through the material. In each cycle of the tool, the depth of penetration of the drill bit may be varied as desired, provided that it is less than the thickness of the material itself for each cycle. Depending upon the type of material involved, the size of the hole to be drilled and other factors, many or only a few cycles will be required to bore the hole. Peck drilling tools of this type have been found to produce an accurate and consistent sized hole in most materials.

While known peck drilling tools have proven to be successful for their intended purpose, they are not without certain disadvantages. One drawback is the size and complexity of the tool. The highly specialized nature of the tool also makes it relatively expensive to manufacture and purchase. Moreover, it has not been possible to transform the conventional, single pass drilling tools into peck drilling tools. As a result, it is usually necessary to purchase an entirely new tool when peck drilling capabilities are required.

Accordingly, there has existed a definite need for a new and improved peck drilling tool that is smaller in size and less complicated than existing peck drilling tools. There also has existed a definite need for a mechanism to convert the conventional, single pass drilling tools into peck drilling tools. The present invention satisfies these needs and provides further related advantages.

SUMMARY OF THE INVENTION

The present invention is embodied in a drilling tool having a special peck drilling mechanism that controls the advancement and retraction of the tool's cutter with respect to a workpiece such that the cutter is advanced into the workpiece a short distance and then withdrawn. The peck drilling mechanism enables this cycle of advancing and then withdrawing the cutter to be repeated, as many times as desired, until the cutter bores a hole in the workpiece to the desired depth. In accordance with the invention, the peck drilling mechanism includes a clutch assembly and a retract mechanism that cooperate together to control the drilling cycles of the tool according to the particular application at hand. This produces an accurate and consistent sized hole in the workpiece in a reliable and repeatable manner.

More particularly, the tool comprises a feed mechanism for advancing and retracting the cutter with respect to the workpiece to remove material from the workpiece, such as when a hole is drilled. A reset mechanism coupled to the feed mechanism has a reset valve movable between a reset position and a vent position. In the reset position, the feed mechanism retracts the cutter away from the workpiece, and in the vent position, it advances the cutter toward the workpiece to drill the hole. The peck drilling mechanism is designed to advance and then retract the cutter with respect to the workpiece in a plurality of cycles such that more material is removed from the workpiece during each drilling cycle of the tool.

In accordance with the invention, the peck drilling mechanism comprises a clutch assembly and a retract mechanism that are both pneumatically connected to the reset mechanism and the feed mechanism noted above. The clutch assembly includes a peck piston and an indexing piston that are movable in response to air pressure controlled by the reset mechanism. The peck piston and indexing piston may be selectively connected to each other by a clutch gear mounted on a clutch piston that is moved back and forth between an engagement position and a disengagement position, depending upon its state of pressurization as controlled by the reset mechanism. In the presence of air pressure, the peck piston and indexing piston are disengaged, and in the absence of air pressure, the peck piston and indexing piston are engaged. The peck piston further includes a peck stop for enabling advancement of the cutter with respect to the workpiece to a predetermined depth during each cycle, while the indexing piston stores the drilling depth of the cutter into the workpiece during each cycle.

The retract mechanism is pneumatically coupled to both the clutch assembly and to the reset mechanism and the feed mechanism. The retract mechanism includes a plurality of valves for controlling movement of the reset valve between the vent position and the reset position in response to movement of the peck piston and operation of the peck stop. The reset mechanism also controls the feed mechanism for advancing and retracting the workpiece with respect to the cutter.

Other features and advantages of the present invention will become apparent from the following detailed description of the preferred embodiment, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is a cross-sectional, diagrammatic view of the tool, similar to FIG. 1, showing the tool in operation during a feed cycle;

FIG. 4 is a cross-sectional view of the clutch assembly of the tool, also illustrated in FIG. 3, showing the clutch assembly from another perspective;

FIG. 5 is another cross-sectional, diagrammatic view of the tool, similar to FIG. I, showing the tool at the start of pecking retract;

FIG. 6 is a cross-sectional view of the clutch assembly of the tool, also illustrated in FIG. 5, showing the clutch assembly from another perspective;

FIG. 7 is another cross-sectional, diagrammatic view of the tool, similar to FIG. 1, showing the tool in an intermediate state of the pecking retract;

FIG. 8 is a cross-sectional view of the clutch assembly of the tool, also illustrated in FIG. 7, showing the clutch assembly from another perspective;

FIG. 9 is another cross-sectional, diagrammatic view of the tool, similar to FIG. 1, showing the tool at the end of pecking retract;

FIG. 10 is a cross-sectional view of the clutch assembly of the tool, also illustrated in FIG. 9, showing the clutch assembly from another perspective;

FIG. 11 is another cross-sectional, diagrammatic view of the tool, similar to FIG. 1, showing the tool at the start of final retract;

FIG. 12 is a cross-sectional view of the clutch assembly of the tool, also illustrated in FIG. 11, showing the clutch assembly from another perspective;

FIG. 13 is another cross-sectional, diagrammatic view of the tool, similar to FIG. 1, showing the tool at the end of final retract; and FIG. 14 is a cross-sectional view of the clutch assembly of the tool, also illustrated in FIG. 13, showing the clutch assembly from another perspective.

DETAILED DESCRIPTION OF THE PREFERRED EMBODIMENT

Figures 1, 2:
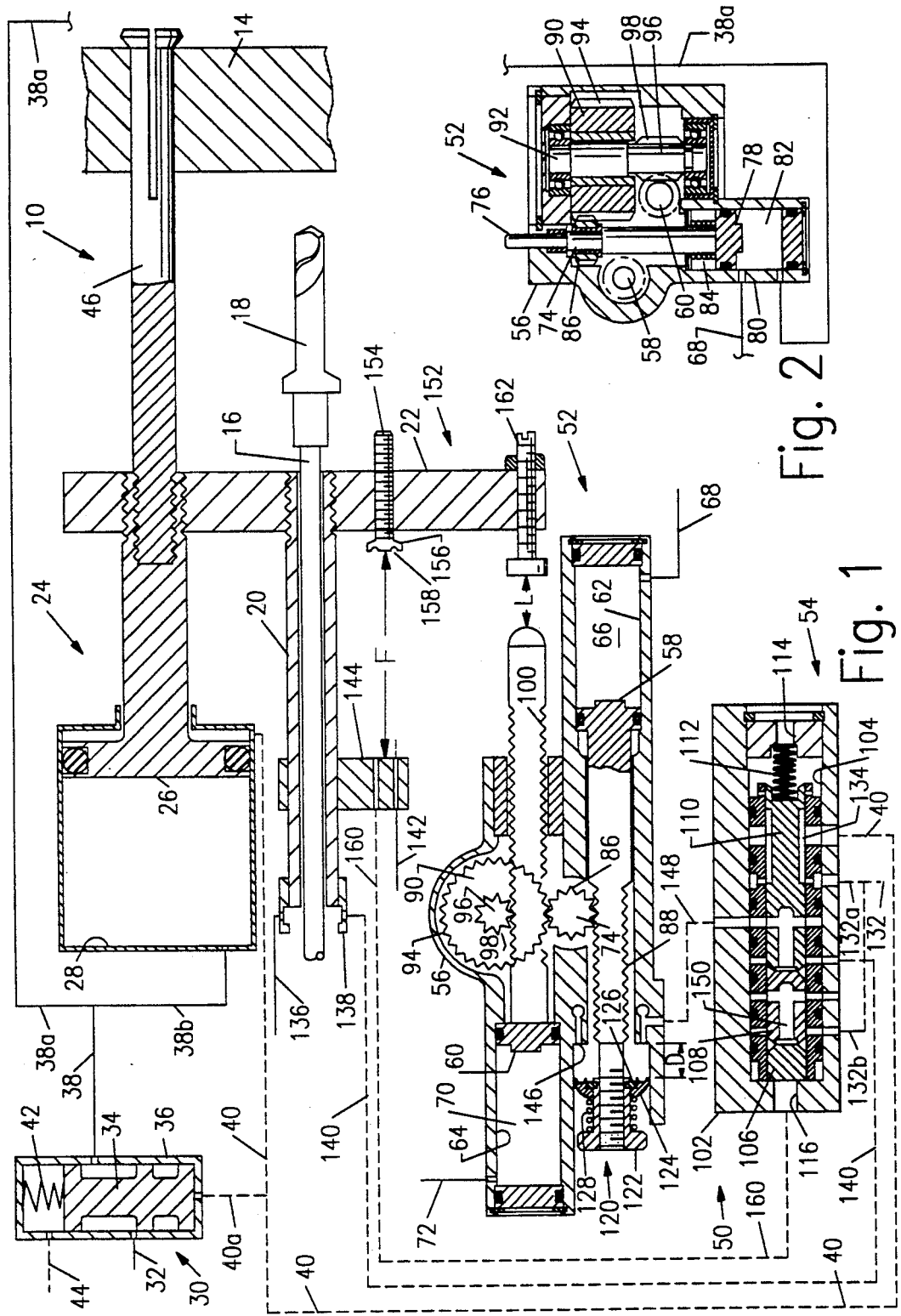
FIG. 1 is a cross-sectional, diagrammatic view of a peck drilling tool embodying the novel features of the present invention, showing the tool in a standby condition.
FIG. 2 is a cross-sectional view of a clutch assembly of the tool, also illustrated in FIG. 1, showing the clutch assembly from another perspective.

As shown in the accompanying drawings, the present invention is embodied in a peck drilling tool, generally referred to by the reference numeral 10, for use in drilling a hole 12 in a workpiece 14 or the like. With reference to FIGS. 1-2 in particular, the tool 10 includes a rotatable spindle 16 having a cutter 18 at its outer end. An air motor (not shown) rotates the spindle 16 within a housing 20 of the tool 10 in response to operation of a trigger valve (also not shown) by the operator. Pressurized air for operating the tool 10 and air motor may be supplied from a suitable source of pressurized air.

The forward end of the housing 20 adjacent to the cutter 18 forms a template foot 22 facing the workpiece 14. A portion of the template foot 22 is connected to a feed mechanism 24 which, as explained below, advances and retracts the cutter 18 with respect to the workpiece 14. More particularly, the feed mechanism 24 comprises a feed piston 26 housed within a feed cylinder 28 for movement in response to air pressure. Air pressure is supplied to the feed cylinder 28 through a reset mechanism 30 that receives and controls the flow of pressurized air from a line 32. The reset mechanism 30 comprises a reset valve 34 that moves within a cylinder 36 between a reset position and a vent position.

In the reset position, shown in FIG. 1, the reset valve 34 connects the line 32 to another line 38 which branches into lines 38a and 38b. Line 38b supplies pressure to the backside of the feed piston 26, while depressurized air vents through the line 40 on the forward end of the piston 26. This pressure resets the feed piston 26 and cutter 18 to a standby condition, with the workpiece 14 retracted from the cutter before drilling commences. A spring 42 at one end of the reset mechanism 30 normally biases the reset valve 34 to the reset position.

In the vent position, shown in FIG. 3, pressurized air is supplied to the other end of the reset valve 34 through a line 40a, which moves the valve and compresses the spring 42. This causes air to vent from the feed cylinder 28 through the lines 38 and 38b to the reset mechanism 30, where it is subsequently vented to the atmosphere through a line 44 leading to the trigger valve. At the same time, pressurized air is introduced to the forward end of the feed piston 26 through line 40, causing the feed cylinder 28 to advance with respect to the feed piston 26. This, in turn, moves the spindle 16 through the housing 20 and the cutter 18 toward the workpiece 14.

The tool 10 is connected to the workpiece 14 by a collet 46 received within a pre-existing hole in the workpiece, in the usual manner as known in the art. Specifically, the collet 46 is connected to the template foot 22 and also to the feed piston 26. Thus, by movement of the feed cylinder 28 in the manner described above, the template foot 22, feed piston 26, collet 46 and workpiece 14 remain stationary while the rotating cutter 18 is advanced and retracted to drill a hole 12.

Drilling tools like that described above are conventional and known in the art. For example, tools having the foregoing construction are available from Deutsch American Pneumatic Tool of Gardena, California, sold under the trademark Spacematic.

In accordance with the invention, the tool 10 is equipped with a peck drilling mechanism 50 that controls the advancement and retraction of the cutter 18 such that it is advanced into the workpiece 14 a short distance and then withdrawn. The peck drilling mechanism 50 enables this cycle of advancing and then withdrawing the cutter 18 to be repeated, as many time as desired, until the cutter bores a hole 12 in the workpiece 14 to the desired depth.

In the preferred embodiment of the invention, as shown in FIGS. 1-2, the peck drilling mechanism 50 comprises a clutch assembly 52 and a retract mechanism 54 that are both pneumatically connected to the reset mechanism 30 and feed cylinder 28 described above. The clutch assembly 52 comprises a clutch housing 56 having a peck piston 58 and an indexing piston 60. Both the peck piston 58 and indexing piston 60 are moveable in response to air pressure introduced into cylinders 62 and 64 that house these pistons, respectively. More particularly, the peck piston 58 has an air chamber 66 at one end of the peck cylinder 62 for receiving pressurized air from the line 68, and the indexing piston 60 has an air chamber 70 at on end of the indexing cylinder 64 for receiving pressurized air from the line 72.

The peck piston 58 and indexing piston 60 may be selectively connected to each other by a clutch gear 74 formed on the shaft 76 of a clutch piston 78. The clutch piston 78 is retained in a clutch cylinder 80 for movement back and forth between an engagement position and a disengagement position in response to air pressure introduced into an air chamber 82 of the clutch cylinder. In the presence of air pressure, as shown best in FIG. 2, the clutch piston 78 is moved to the disengagement position against the force of a spring 84 so that the clutch gear 74 is out of engagement with the peck piston 58. In the absence o air pressure, as shown best in FIG. 4, the spring 84 biases the clutch piston 78 to the engagement position in which teeth 86 on the clutch gear 74 engage teeth 88 on the peck piston 58.

It is noted in FIGS. 2 and 4 that the clutch gear 74 is always connected to the indexing piston 60 through a large gear 90 mounted on one end of a rotating gear shaft 92, such that the teeth 86 of the clutch gear 74 are always engaged with the teeth 94 of the large gear 90, despite the sliding movement of the clutch piston 78 within the clutch cylinder 80. The other end of the gear shaft 92 has a small gear 96 with teeth 98 that engage teeth 100 on the indexing piston 60. Thus, movement of the clutch piston 78 between the engagement position and the disengagement position respectively engages and disengages the peck piston 58 from the indexing piston 60.

The retract mechanism 54 shown in FIG. 1, comprises a valve housing 102 having a cylinder 104 containing three separate valves; a rear valve 106, a middle valve 108 and a forward valve 110. All of these valves are normally biased to the rear of the cylinder 104 (to the left in the drawings) by a spring 112. The retract mechanism 54 is vented to the atmosphere through an opening 114 at the forward end of the cylinder 104, while pressurized air may be introduced to the rear end of the mechanism through a opening 116.

Various other features of the clutch assembly 52 and retract mechanism 54, and their respective cooperation and relationships with the other components of the tool 10, will be described below in conjunction with a description of the tool's peck drilling operation. In this regard, various pneumatic lines are illustrated in the drawings. In some instances the lines are pressurized and in other instances they are vented or under reduced pressure. Accordingly, pressurized lines have been represented by solid continuous lines and vented lines have been represented by dashed broken lines. With this in mind, the operation of the tool 10 will now be described.

FIGS. 1-2 show the tool 10 in a standby condition prior to the start of a drilling operation. In this condition, air pressure is connected to the tool 10 and the trigger valve (not shown) is not depressed by the operator, so that pressurized air will by-pass the trigger valve and be present in line 32. As a result, the reset valve 34 is in the reset position, with pneumatic line pressure being supplied through line 32 to the reset mechanism 30. From the reset mechanism 30, the line pressure is distributed through line 38 to lines 38a and 38b. Line 38b supplies pressure to the backside of the feed piston 26, while air vents through line 40 on the forward end of the piston. As noted above, this pressure resets the feed piston 26 and cutter 18 to the standby condition, with the cutter 18 retracted from the workpiece 14 before drilling commences. Line 38a supplies pneumatic line pressure to the clutch cylinder 80 of the clutch assembly 52. This pressure moves the clutch piston 78 to the disengagement position and compresses the spring 84, thus disengaging the peck piston 58 from the indexing piston 60.

Pressure from the clutch cylinder 80 also is routed to the peck cylinder 62 through another pneumatic line 68. This pressure advances the peck piston 58 through the peck cylinder 62 as far as possible (to the left in the drawings) so that a peck stop 120 at the end of the peck piston protrudes out of the cylinder. The peck stop 120 comprises a cap screw 122 threadably connected to the protruding end of the peck piston 58. A gasket 124 is slidably retained on the body portion of the cap screw 122 and is biased against a retainer ring 126 on the body portion by a spring 128.

Finally, pressure is supplied to the indexing cylinder 64 through a line 72 to move the indexing piston 60 to its ready position. Pressure to the indexing cylinder 64 is routed to the line 72 when the trigger valve is not depressed. This pressure moves the indexing piston 60 to a ready position, independent of the movement of the peck piston 58 (since the clutch gear 74 is disengaged). In the ready position, the indexing piston 60 will advance as far as possible (to the right in the drawings). The retract mechanism 54 is completely vented in the standby condition. At this point, the tool 10 is ready to be activated to begin drilling a hole 12 in the workpiece 14.

FIGS. 3-4 show the tool 10 in operation during a feed cycle which is commenced upon operation of the trigger valve by the operator. During the feed cycle, line pressure is routed through the main air valve to the air motor for continuously driving the spindle 16 and cutter 18 throughout the entire drilling operation. Line pressure also is simultaneously introduced to the retract mechanism 54 through line 132. When the trigger valve is depressed, line 132 is pressurized and air is routed through line 132a to an annular passage 134 in the forward valve 110 of the retract mechanism 54. From there, the pressure is routed through the line 40 which supplies line pressure to the reset mechanism 30 through line 40a and to the forward end of the feed piston 26 through line 40. The pressure from line 40a moves the reset valve 34 to the vent position against the force of the spring 42, allowing pressure from the backside of the feed piston 26 to vent through lines 38 and 38b, where it is subsequently vented to the atmosphere through the reset mechanism 30 by the line 44 which is always vented to the atmosphere. Pressure end of the feed piston 26, causing the feed cylinder 28 to advance (to the right in the drawings) with respect to the feed piston 26. Since the spindle housing 20 and clutch housing 56 are commonly connected with the feed cylinder 28, they also will advance with respect to the feed piston 26.

When line 38 is vented by the reset mechanism 30, line 38a also is vented, thus removing pressurized air from the clutch cylinder 80. In the absence of this pressure, as shown best in FIG. 4, the spring 84 biases the clutch piston 78 to the engagement position so that the teeth 86 on the clutch gear 74 engage the teeth 88 on the peck piston 58. Hence, the peck piston 58 and indexing piston 60 are now engaged with each other. With the indexing cylinder 64 vented through the line 72, movement of the clutch housing 56 causes the forward end of the indexing piston 60 to contact a screw 162 adjustably connected to the template foot 22. As a result, the indexing piston is moved (to the left in the drawings) through the indexing cylinder 64. The peck piston 58 simultaneously moves (to the right in the drawings) through the peck cylinder 62. This movement advances the peck stop 120 toward the peck cylinder 62. As noted above, movement of the feed cylinder 28 caused by pressure from line 40 moves the rotating cutter 18 to begin drilling a hole 12 in the workpiece.

It is also noted in FIG. 3 that pressure is constantly supplied to a line 136 by pressure from the air motor. A valve 138 slidably connected to the spindle housing 20 routes this pressurized air to another line 140 when the housing 20 has moved relative to the valve 138 to open it. Pressure from line 140 is supplied to the retract mechanism 54 around the forward valve 110. Line pressure is also constantly supplied through a line 142 to a depth stop 144 connected to the tool 10 for sliding movement with respect to the housing 20 surrounding the spindle 16. Finally, pressure is introduced to an annular passageway 146 in the peck cylinder 62 through a pressure line (not shown) from the trigger valve.

The depth stop 144 is attached to the tool 18 for movement with the feed cylinder 28. Thus, during advancement of the cutter 18 toward the workpiece 14, the depth stop 144 also advances toward the template foot 22 and toward the workpiece 14.

The feed cycle continues until the cutter 18 has drilled a hole 12 in the workpiece 14 to a predetermined depth that is preferably less than the thickness of the workpiece. This predetermined drilling depth is controlled by the peck stop 120 and corresponds to the distance "D" between the gasket 124 and the end of the peck cylinder 62 shown in FIG. 1. It will be appreciated that the distance "D" may be controlled and adjusted by rotating the cap screw 122 to move it closer to or away from the end of the peck cylinder 62. Hence, the depth of drilling by the cutter 18 during each feed cycle can be controlled by appropriate adjustment of the peck stop 120.

FIGS. 5-6 illustrate operation of the tool 10 at the start of pecking retract, after the cutter 18 has bored into the workpiece 14 to a depth, equal to the distance "D" (FIG. 1), in the first pecking cycle of the tool. Withdrawal of the cutter 18 from the workpiece 14, i.e., pecking retract, is initiated when the annular passageway 146 in the peck cylinder 62 is connected to a line 148 leading to the retract mechanism 54. Connection of the passageway 146 to the line 148 is accomplished when the gasket 124 of the peck stop 120 is moved against the end of the peck cylinder 62 to make that connection. The pressure supplied to the retract mechanism 54 by line 148 enters another passageway 150 in the forward valve 110. This passageway 150 is open at the rear end of the forward valve 110 so that the pressure will cause an initial separation to occur between the forward valve 110 and the middle valve 108, which, in turn, will initially compress the spring 112. Movement of the forward valve 110 by this pressure is not illustrated in FIG. 5, since the start of the pecking retract is initiated by the introduction of pressure in line 148, just prior to separation of the forward valve 110 and middle valve 108. The pressure and venting relationships in all the other lines are the same as described above in connection with the feed cycle, as illustrated in FIGS. 3-4.

FIGS. 7-8 show the tool 10 during an intermediate stage of the pecking retract. At this point, the middle valve 108 and forward valve 110 have initially separated by the pressure from line 148. This initial separation caused by pressure from the line 148 allows existing pressure in the line 140 to enter the retract mechanism 54 and maintain separation between the middle valve 108 and the forward valve 110 until the end of the pecking retract state shown in FIGS. 9-10, discussed below. Movement of the forward valve 110 by this pressure compresses the spring 112 and causes the annular passage 134 to disconnect line 132a from line 40. As a result, line 40 is no longer pressurized and is therefore vented through the opening 114 at the forward end of the retract mechanism 54 and throughout the line 40. The venting of line 40, in turn, vents line 40a. The venting of line 40a causes the reset valve 34 to move to the reset position so that pressure now enters line 38 and line 38b to the backside of the feed piston 26. Simultaneously, the venting of line 40 vents the feed cylinder 28 at the forward end of the feed piston 26.

The pressurization of line 38 also pressurizes line 38a leading to the clutch cylinder 80 of the clutch assembly 52, as shown in FIG. 8. This pressure moves the clutch piston 78 to the disengagement position against the force of the spring 84 so that the clutch gear 74 is now out of engagement with the peck piston 58. Simultaneously, line 68 is pressurized by air routed through the clutch cylinder 80 which, in turn, pressurizes the peck cylinder 62, moving the peck piston 58 (to the left in the drawings) through the peck cylinder. However, because the clutch gear 74 is in the disengagement position, the indexing piston 60 does not move in response to movement of the peck piston 58. Instead, and importantly, the indexing piston 60 maintains its position, as the line 72 is still vented.

FIGS. 9-10 show the position and relationships of the tool's components at the end of the pecking retract. In this condition, the tool 10 is essentially at the point where a feed cycle is being initiated. Thus, the tool 10 as illustrated in FIGS. 9-10 is essentially the same as illustrated in FIGS. 3-4 described in detail above.

As described above in conjunction with FIGS. 7-8, the tool 10 reaches the end of the pecking retract when the spindle valve 138 moves to a closed position, disconnecting the pressurized line 136 and causing line 140 to vent to the atmosphere. This will not happen until the cutter 18 is fully retracted (which allows the spindle valve 138 to close). The peck piston 58 also is moved (to the left in the drawings) through the peck cylinder 62 by pressure from line 68 (See FIG. 8). This disengages the peck stop gasket 124 from the end of the peck cylinder 62, causing line 148 to be no longer pressurized and, therefore, in a venting state. The absence of pressure in lines 140 and 148 relieves the pressure on the retract mechanism's forward valve 110, causing it to return to an abutting relationship with the middle valve 108 through the force of the spring 112. This movement of the forward valve 110 reconnects pressurized line 132 and 132a to line 40. Pressure from line 40 supplies line pressure to the reset mechanism 30 through line 40a and the to the forward end of the feed piston through the extension of line 40. The pressure from line 40a moves the reset valve 34 to the vent position against the force of the spring 42, allowing pressure from the backside of the feed piston 26 to vent through lines 38 and 38b, where it is subsequently vented to the atmosphere through the reset mechanism 30. Pressure from line 40 introduces pressurized air to the forward end of the feed piston 26, causing the feed cylinder 28 to move with respect to the feed piston 26.

As shown in FIGS. 9-10, when the feed cylinder 28 moves with respect to the feed piston 26, the spindle valve 138 opens to supply pressurized air to the line 140, as before. Also, when line 38 is vented by the reset mechanism 30, line 38a also is vented, thus removing pressurized air from the clutch cylinder 80. In the absence of this pressure, as shown best in FIG. 10, the spring 84 biases the clutch piston 78 to the engagement position so that the peck piston 58 and indexing piston 60 are again engaged with each other. With the indexing cylinder 64 vented through line 72, movement of the clutch housing 56 causes the indexing piston to contact the screw 162 and move (to the left in the drawings) through the indexing cylinder 64. The peck piston 58 simultaneously moves (to the right in the drawings) through the peck cylinder 62, as in the initial feed cycle. This movement of the peck piston 58 advances the peck stop 120 toward the peck cylinder 62 another time as the rotating cutter 18 is moved toward the workpiece 14 to begin the next drilling cycle to remove more material from the hole 12 in the workpiece 14.

The pecking cycle described above in connection with FIGS. 1-10 is repeated until a hole 12 is drilled in the workpiece 14 to a desired depth. The depth of drilling at the end of the entire drilling operation is controlled by an adjustable depth stop mechanism 152. The depth stop mechanism 152 comprises the depth stop 144 described above and a screw 154 threadably received through the template foot 22. The screw 154 has a specially shaped head in the form of a gasket 156 that faces the depth stop 144. The gasket 156 has a passageway 158 that is designed to pneumatically connect line 142 to a line 160 when the depth stop 144 contacts the gasket 156 at the start of the final pecking retract of the tool 10 (i.e., at the completion of the entire drilling operation).

FIGS. 11-12 show the tool 10 at the point where the final pecking retract is starting. At this point, the depth stop 144 has contacted the gasket 156 and the line 142, which is pressurized, is connected to the line 160. Pressurization of line 160 routes pressure to the rear opening 116 of the retract mechanism 54 and causes a build up of pressure behind the rear valve 106. This pressure causes the rear valve 106, the middle valve 108 and the forward valve 110 to be moved as a unit (to the right in the drawings) through the retract mechanism 54 against the force of the spring 112. Movement of the forward valve 110 eventually disconnects line 132a which is pressurized, from line 40. Thus, line 40 is vented, as is line 40a. The venting of line 40a allows the reset valve 34 to move under the force of the spring 42 to the reset position. In the reset position, the reset valve 34 connects line 32 to line 38 which supplies pressure to the backside of the feed piston 26, while air vents through line 40 on the forward end of the piston 26. This pressure starts to reset the feed piston 26 and move the cutter 18 toward the standby condition described above, with the cutter 18 retracted from the workpiece 14.

Pressure supplied by line 38 also is routed by line 38a to the clutch cylinder 80 which moves the clutch piston 78 and clutch gear 74 and disengages the peck piston 58 from the indexing piston 60. Pressure from the clutch cylinder 80 also is routed through line 68 to the peck cylinder 62 to move the peck piston 58 (to the left in the drawings) through the peck cylinder. In this condition, shown in FIGS. 11-12, line 148 is vented since the peck stop 120 is spaced from the end of the peck cylinder 62.

FIGS. 13-14 show the tool 10 at the end of final retract. In this condition of the tool 10, line 132 is still pressurized and supplies pressure through line 132b to separate the rear valve 106 from the middle valve 108. Movement of the rear valve 106 is facilitated by the venting of line 160 upon separation of the depth stop 144 from the gasket 156 which disconnects the pressurized line 142 from line 160. Line 40 is still vented, and lines 38a and 38b are still pressurized to move the feed cylinder 28 fully to the standby condition and to keep the clutch gear 74 in the disengagement position so that the peck piston 58 and indexing piston 60 are not engaged. When line 132 is depressurized and line 72 is pressurized by releasing the trigger valve, the tool 10 will move to the standby condition shown in FIGS. 1-2. This fully resets the tool 10 for the next drilling operation.

An important feature of the peck drilling mechanism 50 of the present invention, is that it has a relatively compact design that is not unduly expensive to manufacture. Moreover, the peck drilling mechanism 50 may be added to certain existing drilling tools to convert them from conventional, single pass drilling tools into peck drilling tools. Thus, it is not necessary to purchase an entirely new tool when peck drilling capabilities are required. Rather, the existing tool may be simply retrofitted with the peck drilling mechanism 50 of the present invention. Retrofitting is accomplished by connecting line 40 to line 40a so that the retract mechanism 54 can control and cycle the feed cylinder 28 and reset mechanism 30 of the existing tool. Next, line 38a is connected to the clutch cylinder 80 of the clutch assembly 52 to control the pecking cycles and depth of penetration of the cutter 18 into the workpiece 14 during each feed cycle. Finally, the depth stop mechanism 152 is added to connect line 142 to line 160, and line 136 and the spindle valve 138 are added to connect line 140 to the retract mechanism 54.

The adjustable screw 162 also allows selective use of the peck drilling features. As shown in FIG. 1, a distance "L" between the screw 162 and indexing piston 60 and a distance "F" between the depth stop 144 and screw 154 determine when the peck drilling capabilities will be utilized. In general, the distance "L" will determine when the peck cycle will start. If the distance "L" is less than the distance "F," then the peck cycle will operate. However, if the distance "L" is greater than the distance "F," then the peck cycle will not operate, since the depth stop 144 would contact the gasket 156 and cause the tool 10 to go to the standby condition, thus ending the drilling operation. Thus, by appropriate adjustment of the screws 154 and 162, use of the peck drilling features can be advantageously controlled.

While a particular form of the invention has been illustrated and described, it will be apparent that various modifications can be made without departing from the spirit and scope of the invention. Therefore, it is not intended that the invention be limited, except as by the appended claims.

I claim:

1. A peck drilling apparatus for use with a drilling tool having a cutter for removing material from a workpiece, comprising:
   (a) a feed mechanism for advancing and retracting the cutter with respect to the workpiece to remove material from the workpiece;
   (b) a reset mechanism coupled to the feed mechanism, the reset mechanism having a reset valve movable between a reset position, in which the feed mechanism retracts the cutter from the workpiece, and a vent position, in which the feed mechanism advances the cutter toward the workpiece; and (c) a peck mechanism for causing the cutter to be advanced and then retracted from the workpiece in a plurality of cycles wherein more material is removed from the workpiece during each such cycle, the peck mechanism having a clutch assembly coupled to the feed mechanism and being moved to a disengagement position when the rest valve is in the reset position and the feed mechanism is retracting the cutter with respect to the workpiece, and being moved to an engagement position when the reset valve is in the vent position and the feed mechanism is advancing the cutter with respect to the workpiece, the clutch assembly being engaged with peck stop means in the engagement position for enabling advancement of the cutter with respect to the workpiece to a predetermined depth during each cycle, and indexing means for storing the depth of the cutter into the workpiece during each cycle; and a retract mechanism coupled to the clutch assembly and to reset mechanism having valve means for controlling movement of the reset valve between the vent position and the reset position in response to the peck stop means, and for controlling the feed mechanism for advancing and retracting the cutter with respect to the workpiece.

2. The apparatus of claim 1, wherein the clutch assembly and the indexing means comprise:

(a) an indexing piston adapted to be moved between a first direction and a second direction within an indexing cylinder;

(b) a peck piston within a peck cylinder, the peck piston being adapted to be moved in the first direction during advancement of the cutter toward the workpiece and in the second direction during retraction of the cutter with respect to the workpiece;

(c) a clutch piston within a clutch cylinder that is pneumatically coupled to the feed mechanism and the retract mechanism, the clutch piston having gear means for constant engagement with the indexing piston and selective engagement and disengagement with the peck piston; and (d) biasing means for moving the clutch piston into engagement with the peck piston when the reset valve is in the vent position, such that movement of the peck piston in the first direction during advancement of the cutter with respect to the workpiece causes corresponding movement of the indexing piston in the second direction, said clutch piston being moved out of engagement with the peck piston by pressure means when the reset valve is in the reset position, such that movement of the peck piston in the second direction during retraction of the cutter with respect to the workpiece does not cause corresponding movement of the indexing piston.

3. The apparatus of claim 2, wherein the peck stop means is coupled to the indexing piston and is adapted to control the distance which the cutter advances toward the workpiece during each cycle of advancing and retracting of the cutter with respect to the workpiece.

4. The apparatus of claim 3, wherein the peck stop means causes pressurized air to flow to the retract mechanism when the cutter has advanced toward the workpiece to a predetermined distance to thereby cause the cutter to begin retracting from the workpiece.

5. The apparatus of claim 3, further comprising depth stop means for ending said plurality of cycles of advancing and retracting of the cutter with respect to the workpiece when the cutter has removed a predetermined amount of material from the workpiece.

* * * * *

UNITED STATES PATENT AND TRADEMARK OFFICE
CERTIFICATE OF CORRECTION

PATENT NO. : 5,215,416
DATED      : June 1, 1993
INVENTOR(S) : Ahmed El Dessouky It is certified that error appears in the above-identified patent and that said Letters Patent is hereby corrected as shown below:

Col. 5, ln. 1:      at on end (should be)
                    at one end

Col. 5, ln. 14:     absence o (should be)
                    absence of

Col. 5, ln. 40:     through a opening (should be)
                    through an opening Col. 8, ln. 61:     the to the (should be)
                    then to the Col. 11, ln. 12:    the rest valve (should be)
                    the reset valve Col. 11, ln. 26:    mechanism having (should be)
                    mechanism and the feed mechanism, the
                    retract mechanism having Signed and Sealed this Twenty-fifth Day of January, 1994

Attest:

BRUCE LEHMAN

*Attesting Officer*       *Commissioner of Patents and Trademarks*